W. L. BRISTOW.
FISHING ROD.
APPLICATION FILED JULY 27, 1914.
1,159,466.
Patented Nov. 9, 1915.
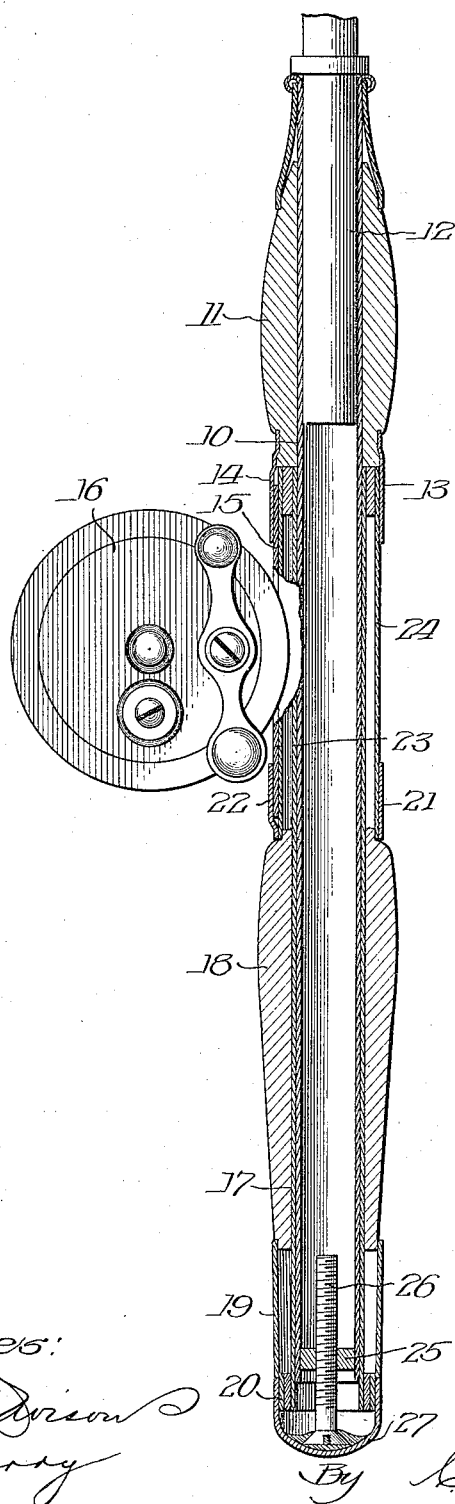

UNITED STATES PATENT OFFICE.

WILLARD L. BRISTOW, OF DE KALB, ILLINOIS.

FISHING-ROD.

1,159,466.  Specification of Letters Patent.  Patented Nov. 9, 1915.

Application filed July 27, 1914. Serial No. 853,340.

*To all whom it may concern:*

Be it known that I, WILLARD L. BRISTOW, a citizen of the United States, and resident of De Kalb, in the county of Dekalb and State of Illinois, have invented certain new and useful Improvements in Fishing-Rods, of which the following is a specification.

My invention relates to fishing rods and has particular reference to a novel reel lock for application thereto.

As is well known, fishing rods are usually equipped with a reel, said reel being detachably secured to the handle of the rod. The customary method of attachment is to provide the reel with a pair of oppositely projecting wings one of which is adapted to be seated beneath a fixed band on the handle and the other beneath a movable band. However, in practice the reel frequently becomes disengaged with unpleasant results and this invention is directed to means for locking the reel in place in such manner that it may be readily disengaged but cannot become accidentally displaced.

My invention contemplates the construction of the handle in two interfitting parts each part carrying a reel engaging clip, the parts being adapted to be held in adjusted position by means of a nut or other screw means, usually in the form of a rotatable ferrule at the butt of the handle.

In the drawing the figure is a longitudinal sectional view through a rod handle constructed in accordance with my invention.

Referring more particularly in the drawing it will be seen that my novel rod handle is composed of a tubular core member 10, extending practically from end to end of the handle, to one end of which is fixedly secured a cork grip 11. Within this end of the tubular member the butt 12, of the rod is adapted to be inserted. The grip 11 is provided with a ferrule 13, deflected outwardly as at 14, to provide a recess within which the foot or wing 15, of the reel 16 is adapted to be accommodated.

The lower portion of the handle includes a tubular member 17, within which the tube 10 is fitted, the tubular member 17 having secured thereto a second cork grip 18, held at its lower end by means of a ferrule 19, having a reduced end 20. The other end of this cork grip is provided with a band 21, enlarged as at 22, to accommodate the opposite foot 23 of the reel 16. The reel rests upon a tubular member 24, securely fixed to the handle 18 and the tube 17.

Securely held within the interior of the tube 10 at its lower end is a nut 25, with which a screw 26, engages. The head of this screw is securely fixed in a cap 27, fitted over the reduced end 20 of the ferrule 19 and adapted for rotation thereon. The periphery of the cap 27, may be knurled to provide against slipping when engaged by the fingers.

As will be seen from the previous description, the handle 11 and tube 10 are movable relative to the handle 18 and tube 17, the tube 10, sliding within the tube 17. This movement is controlled by means of the engagement between the screw 26 and nut 25, the nut being fixed within the tube 10. When the reel 16 is to be removed from engagement with the rod, the cap 27 and screw 26 are rotated to the required extent to permit the separation of the two handles and their attached ferrules or bands 14, 22, in order that the projections 15, 23, of the reel may be disengaged. When the reel is to be replaced one of the projections is located underneath the band 22, and the handle 11, carrying the band 14, is forced downwardly. The cap 27 is then screwed up securely holding the parts in adjusted position.

The grip 11 and tube 10 are not relatively movable. The tube 10, grip 11, ferrule and clip 14 are rigid with each other. The tube 17, handle 18, ferrule and clip 21, 22 and reel support 24 are rigid, the tube 17 sliding on the tube 10. The locking element consists in the screw threaded member 26, which engages the plug 25 which is rigid with the tube 10. The cap 27, which is attached to the screw threaded member, is merely in abutting engagement with the handle portion, and the cap 27 may be rotated and entirely removed without moving the parts from the position shown in the figure. When it is desired to remove the reel, as shown in the figure, the cap 27 is rotated to remove the same a substantial distance from the end of the handle portion, whereupon the two grips 11, 18 are grasped and pulled away from each other. This separates the clips 14, 22. When the reel is to be located on the rod, the parts are positioned as just described, the reel located, and the two grips with their associated parts forced toward each other until the reel is securely held, whereupon the locking cap is screwed upwardly and the parts are held against accidental displacement.

Obviously the construction is capable of considerable modification and such modifications as are within the scope of my claim I consider within the spirit of my invention.

I claim:

In a fishing rod, a core, a tubular handle portion closely fitting but slidable on said core, a reel-holding clip fixed to said core, a similar clip secured to said handle portion, and a nut having screw-threaded engagement with said core, said nut being mounted at the butt end of the handle and in abutting engagement only with an end of said handle portion, the arrangement being such that the clips may be forced into engagement with a reel without reference to said nut, substantially as described.

WILLARD L. BRISTOW.

Witnesses:
S. GLENN ROWAN,
M. E. BRISTOW.